United States Patent [19]

Kitaura et al.

[11] 3,995,284
[45] Nov. 30, 1976

[54] AUTOMATIC EXPOSURE TIME CONTROL CIRCUIT

[75] Inventors: Mashio Kitaura, Suga Tondabayashi; Seiji Yamada, Sakai, both of Japan

[73] Assignee: Minolta Camera Kabushiki Kaisha, Osaka, Japan

[22] Filed: Dec. 28, 1973

[21] Appl. No.: 429,276

[30] Foreign Application Priority Data
Dec. 29, 1972 Japan................................ 48-1514
Dec. 29, 1972 Japan................................ 48-1515

[52] U.S. Cl................................ 354/23 D; 354/24; 354/50; 354/60 A
[51] Int. Cl.² .......................................... G03B 7/08
[58] Field of Search .............. 354/24, 50, 60, 23 D, 354/51, 60 A

[56] References Cited
UNITED STATES PATENTS

| | | | |
|---|---|---|---|
| 3,703,130 | 11/1972 | Watanabe | 354/24 |
| 3,748,979 | 7/1973 | Wada | 354/23 D |
| 3,824,608 | 7/1974 | Toyoda | 354/23 D |
| 3,827,065 | 7/1974 | Wada | 354/23 D |
| 3,900,855 | 8/1975 | Stempeck | 354/50 |

FOREIGN PATENTS OR APPLICATIONS
45-4903   2/1970   Japan.................................. 354/24

Primary Examiner—Russell E. Adams, Jr.
Attorney, Agent, or Firm—Staas & Halsey

[57] ABSTRACT

An automatic exposure time control circuit for use with a camera having a shutter. A light measuring circuit for measuring the scene brightness passing through the camera lens produces an electric signal proportional to the logarithm of the scene brightness. An A-D converter circuit converts the output signal from the light measuring circuit to a digital signal. A first decoder, having a plurality of output terminals, receives the converted, digital signal and produces an output at a corresponding one of the output terminals. An exposure time control circuit, comprising a binary counter having the same number of stages and output terminals as the number of output terminals of the first decoder is set to the output of the decoder upon release of the shutter. A pulse generator supplies a train of pulses to the binary counter of the exposure time control circuit, the latter counting a number of pulses corresponding to the output of the decoder to which it was set, thereupon closing the shutter and thereby controlling the exposure time.

12 Claims, 14 Drawing Figures

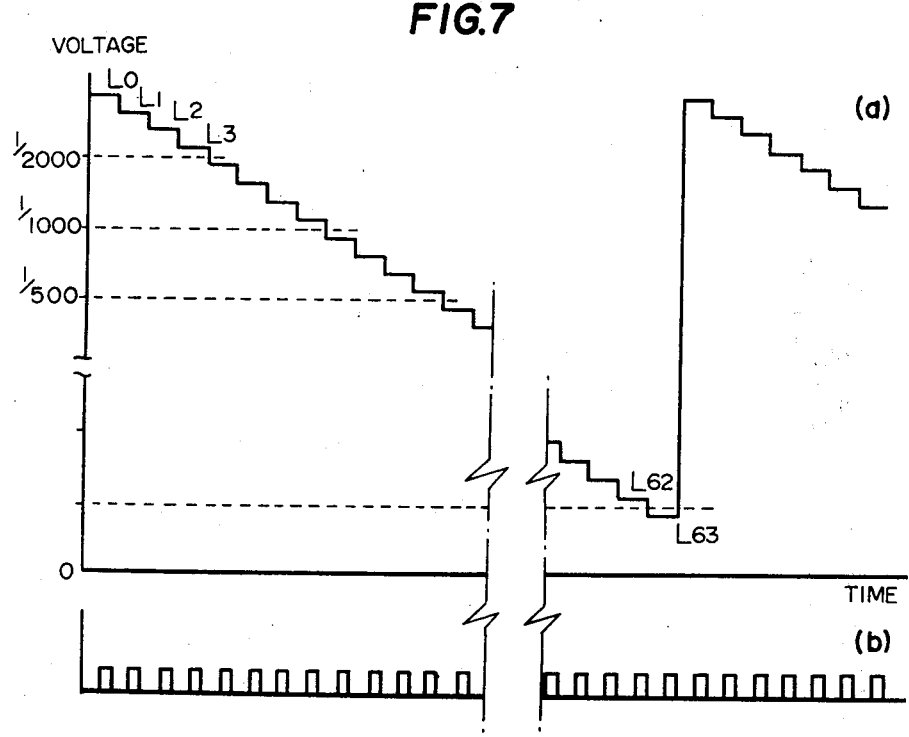

FIG. 9

| CLOCK PULSE | F01 | F02 | F1 | F2 | F3 | F4 | L1 | |
|---|---|---|---|---|---|---|---|---|
| 0 | 1 | 1 | 1 | 1 | 1 | 1 | L0 | |
| 1 | 0 | 1 | 1 | 1 | 1 | 1 | L1 | |
| 2 | 1 | 0 | 1 | 1 | 1 | 1 | L2 | |
| 3 | 0 | 0 | 1 | 1 | 1 | 1 | L3 | |
| 4 | 1 | 1 | 0 | 1 | 1 | 1 | L4 | 1/2000 |
| 5 | 0 | 1 | 0 | 1 | 1 | 1 | L5 | |
| 6 | 1 | 0 | 0 | 1 | 1 | 1 | L6 | |
| 7 | 0 | 0 | 0 | 1 | 1 | 1 | L7 | |
| 8 | 1 | 1 | 1 | 0 | 1 | 1 | L8 | 1/1000 |
| 9 | 0 | 1 | 1 | 0 | 1 | 1 | L9 | |
| 10 | 1 | 0 | 1 | 0 | 1 | 1 | L10 | |
| 11 | 0 | 0 | 1 | 0 | 1 | 1 | L11 | |
| 12 | 1 | 1 | 0 | 0 | 1 | 1 | L12 | 1/500 |
| 13 | 0 | 1 | 0 | 0 | 1 | 1 | L13 | |
| ⋮ | | | | | | | ⋮ | |
| 55 | 0 | 0 | 0 | 1 | 0 | 0 | L55 | |
| 56 | 1 | 1 | 1 | 0 | 0 | 0 | L56 | 4 |
| 57 | 0 | 1 | 1 | 0 | 0 | 0 | L57 | |
| 58 | 1 | 0 | 1 | 0 | 0 | 0 | L58 | |
| 59 | 0 | 0 | 1 | 0 | 0 | 0 | L59 | |
| 60 | 1 | 1 | 0 | 0 | 0 | 0 | L60 | 8 |
| 61 | 0 | 1 | 0 | 0 | 0 | 0 | L61 | |
| 62 | 1 | 0 | 0 | 0 | 0 | 0 | L62 | |
| 63 | 0 | 0 | 0 | 0 | 0 | 0 | L63 | |

| Fo1 | Fo2 | G | H | I | J | K | L | Mi |
|---|---|---|---|---|---|---|---|---|
| 1 | 1 | 1 | 1 | 1 | 1 | 1 | 1 | 63 |
| 0 | 1 | 1 | 1 | 0 | 1 | 0 | 1 | 53 |
| 1 | 0 | 1 | 0 | 1 | 1 | 0 | 1 | 45 |
| 0 | 0 | 1 | 0 | 0 | 1 | 0 | 1 | 37 |

| Fo1 | Fo2 | G | H | I | J | K | L | Mi |
|---|---|---|---|---|---|---|---|---|
| 1 | 1 | 1 | 0 | 0 | 1 | 0 | 1 | 37 |
| 0 | 1 | 1 | 0 | 1 | 1 | 0 | 1 | 45 |
| 1 | 0 | 1 | 1 | 0 | 1 | 0 | 1 | 53 |
| 0 | 0 | 1 | 1 | 1 | 1 | 1 | 1 | 63 |

AUTOMATIC EXPOSURE TIME CONTROL CIRCUIT

BACKGROUND OF THE INVENTION

1. Field of the Invention

This invention relates to an automatic exposure time control circuit of digital design for use with a single lens reflex camera having a through-the-lens-type light measuring system.

2. Description of the Prior Art

As is well known in the art, a common type of automatic exposure time control circuit for a single lens reflex camera of the through-the-lens light measuring type responds to the scene brightness and stores information representative of the sensed level of the brightness, prior to actuation of the camera shutter. The exposure time thus is controlled as a function of the stored information. Typically, a voltage is generated which is proportional to the logarithm of the scene brightness (referred to as a logarithmic compression) and the voltage is stored, for example, as an analog value in a capacitor or, after A-D conversion, is stored in the form of a digital voltage. Closing of the shutter, and thus control of exposure, is performed in relation to the stored value of the scene brightness (this operation typically being referred to as logarithmic expansion).

In the known circuits as described above, in the case of exposure, the brightness information converted into a digital voltage, is reconverted into an analog current proportional to the scene brightness, by which a capacitor is charged, and the time for the charging of the capacitor to reach a predetermined level is used to control the exposure time. In this case, a diode or transistor having a logarithmic characteristic is used, with the result that a temperature compensating circuit is required to provide accuracy. Adjustment of the circuit, however, is time-consuming. Further, the A-D conversion of the voltage proportional to the logarithm of the scene brightness, mentioned above, inevitably results in a conversion error between the analog value and the digital value.

SUMMARY OF THE INVENTION

An object of this invention is to provide an improved automatic exposure time control circuit for single lens reflex cameras employing principally digital controls. An analog voltage proportional to the logarithm of the scene brightness is converted into a digital value and stored.

Clock pulses of a known repetition rate are counted until a number corresponding to the stored digital value is accumulated, and the time required to complete this counting is used as an exposure time whereby the exposure time is controlled.

The automatic exposure time control circuit for a single lens reflex camera, according to this invention, features the combined use of a circuit for the digital conversion of a voltage proportional to the logarithm of the scene brightness and a binary counter circuit for controlling the exposure time, wherein the larger part of the overall circuit construction is formed with digital circuits. This reduces the number of circuit parts requiring adjustments, thereby reducing the time for adjusting the circuit construction, as compared with the prior art. A further feature of this invention relates to reducing the error resulting from the conversion of the analog voltage corresponding to the sensed, logarithmic scene brightness value into a corresponding digital value, and specifically the number of bits of the counter of the A-D converter circuit is increased, thereby to reduce the value, or magnitude, of each counting unit, improving thereby the logarithmic expansion and enabling highly accurate automatic exposure time control.

BRIEF DESCRIPTION OF THE DRAWINGS

In the detailed description of the preferred embodiments of the invention presented below, reference is made to the accompanying drawings, in which:

FIG. 7 is a graph showing the output level $a$ of a resistance network in the FIG. 6 example, in comparison with a clock pulse $b$;

FIG. 9 is a table showing the states of outputs from flip-flops resulting from clock pulse counting by a binary counter $5'$ and the output levels of the resistance network $4'$ corresponding to the states of the outputs in the FIG. 6 example;

DESCRIPTION OF THE PREFERRED EMBODIMENTS

Figure 1:
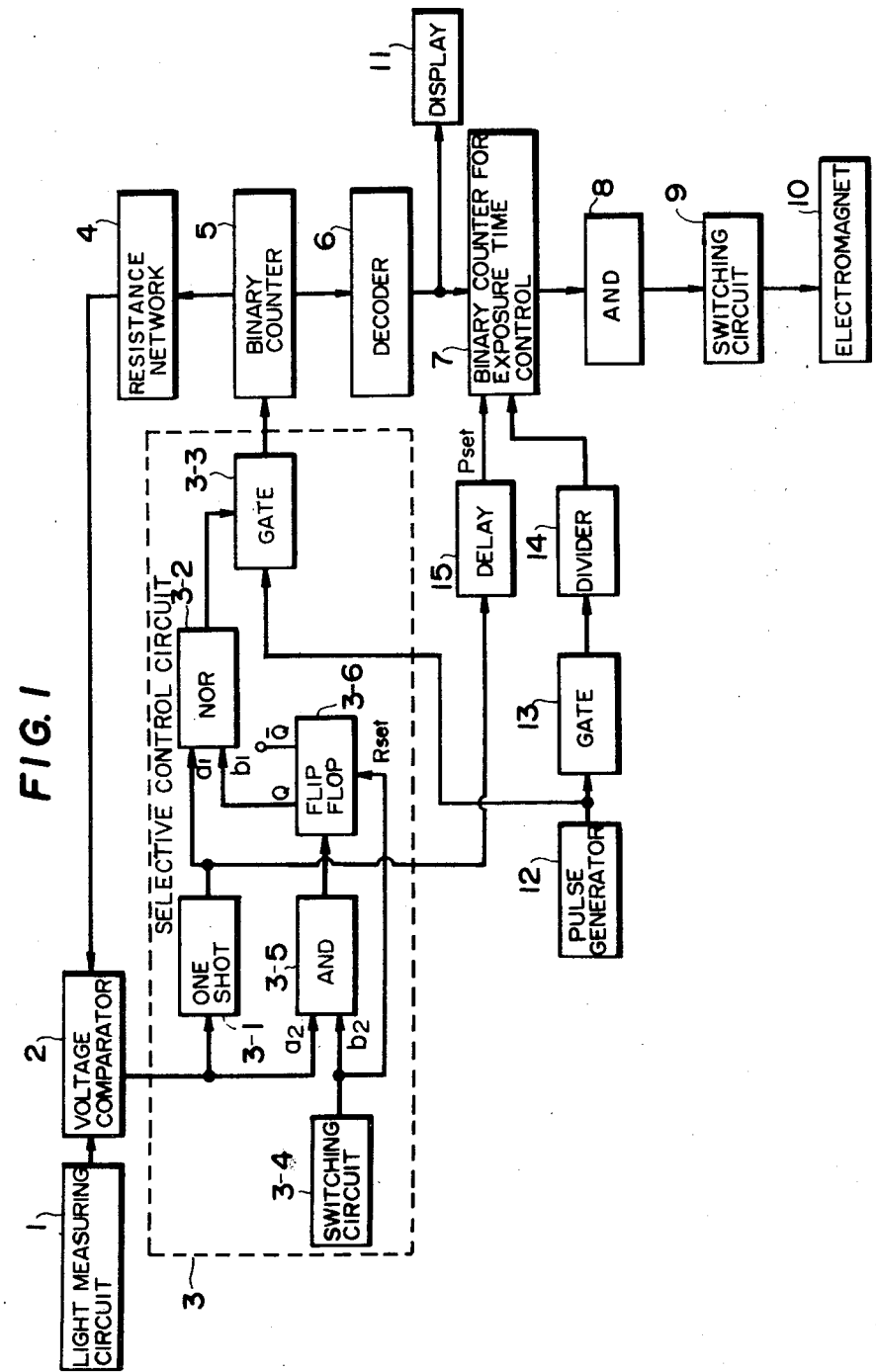
FIG. 1 is a block diagram showing one example of an automatic exposure time control circuit according to this invention.

In FIG. 1, there is shown in block form one example of the automatic exposure time control circuit of this invention.

Reference numeral 1 indicates a light measuring circuit, which produces an output in proportion to the logarithm of the scene brightness. Information indicative of a preset aperture value and the film sensitivity can be included in this output.

Reference numeral 2 designates a voltage comparator circuit; 3 denotes a selective control circuit; 4 represents a resistance network; 5 identifies a binary counter circuit; and 6 indicates a decoder. These circuits 2, 3, 4 and 5 make up an A-D converter circuit having associated therewith the decoder 6, and by which the analog output voltage from the light measuring circuit 1 is converted into a digital voltage. The light measuring circuit 1 and the A-D converter circuit and the associated decoder 6 are shown in detail in FIG. 2, which will be described later on.

Reference numeral 7 designates a binary counter circuit for controlling an exposure time, which is supplied with the output from the decoder 6 and counts a number of clock pulses, based on the decoder 6 output.

Reference numeral 8 denotes an AND circuit, which detects the instant of completion of the counting of the clock pulses by the counter circuit 7 and applies at that instant a signal to a switching circuit 9.

Reference numeral 9 represents the aforesaid switching circuit, which terminates the excitation of an electromagnet 10. The shutter is closed by cutting off the excitation of the electromagnet 10 in a known manner.

Reference numeral 11 identifies an indicator unit, i.e., a display which provides a digital indication of an exposure time based on the output from the decoder 6.

Reference numeral 12 indicates a clock pulse generator circuit, which produces the clock pulses which are supplied to and counted by the counter circuit 7 and, at the same time, by the binary counter circuit 5. Alternatively, a separate clock pulse generator circuit may be provided for the binary counter circuit 5.

Reference numeral 13 designates a gate circuit or a switch, which is ganged with a shutter blade opening member (not shown) and permits the passage therethrough of the clock pulses from the clock pulse generator circuit 12 for supply to a divider 14 simultaneously with the opening of the shutter blade.

The divider 14, for example, may comprise a flip-flop, which serves to divide the frequency of the clock pulses from the clock pulse generator circuit 12 for supply to counter 7 at a lower frequency.

Reference numeral 15 denotes a delay circuit, which is supplied with a pulse from a one-shot multivibrator 3-1 described later, to supply the exposure time control counter circuit 7 with a preset signal, delayed with respect to the pulse from the one-shot multivibrator 3-1.

Now, a detailed description will be given of the aforesaid selective control circuit 3.

Reference numeral 3-1 identifies the aforementioned one-shot multivibrator, which is supplied with the output from the voltage comparator circuit 2 to apply a pulse signal to a NOR circuit 3-2 for a period of time at least some dozens of times greater than the period of the clock pulses derived from the clock pulse generator circuit 12, as will be described later on.

Reference numeral 3-3 represents a gate circuit, which enables and inhibits the passage therethrough of the clock pulses from the clock pulse generator circuit 12 in accordance with the state of the output from the NOR circuit 3-2. If either one of inputs $a_1$ and $b_1$ to the NOR circuit 3-2 is in its 1 state, the gate circuit 3-3 is closed. A voltage level of ground potential is taken as 0 and a voltage of higher level is taken as 1.

Reference numeral 3-4 denotes a switching circuit including a switch ganged with a shutter actuating member (not shown), which is adapted to provide the voltage 1 slightly before the opening of the shutter and the voltage 0 upon closing of the shutter in the course of film exposure.

Reference numeral 3-5 indicates an AND circuit, which produces an output voltage level of 1 when inputs $a_2$ and $b_2$ thereto are both in their 1 state.

Reference numeral 3-6 represents a flip-flop, which is adapted to operate so that when the output from the switching circuit 3-4 is in its 0 state and is applied to a reset terminal Rset of the flip-flop 3-6, the output Q is in its 0 state and the output $\bar{Q}$ is in its 1 state. Where the output from the switching circuit 3-4 is in its 1 state as applied to the reset terminal of the flip-flop 3-6, the outputs from the flip-flop 3-6 may be reversed and, under such conditions, if the output from the AND circuit 3-5 becomes 1, the outputs Q and $\bar{Q}$ are altered to their 1 and 0 states, respectively. In other words, while the shutter is held open, a gate circuit 3-3 is closed.

Figure 2:
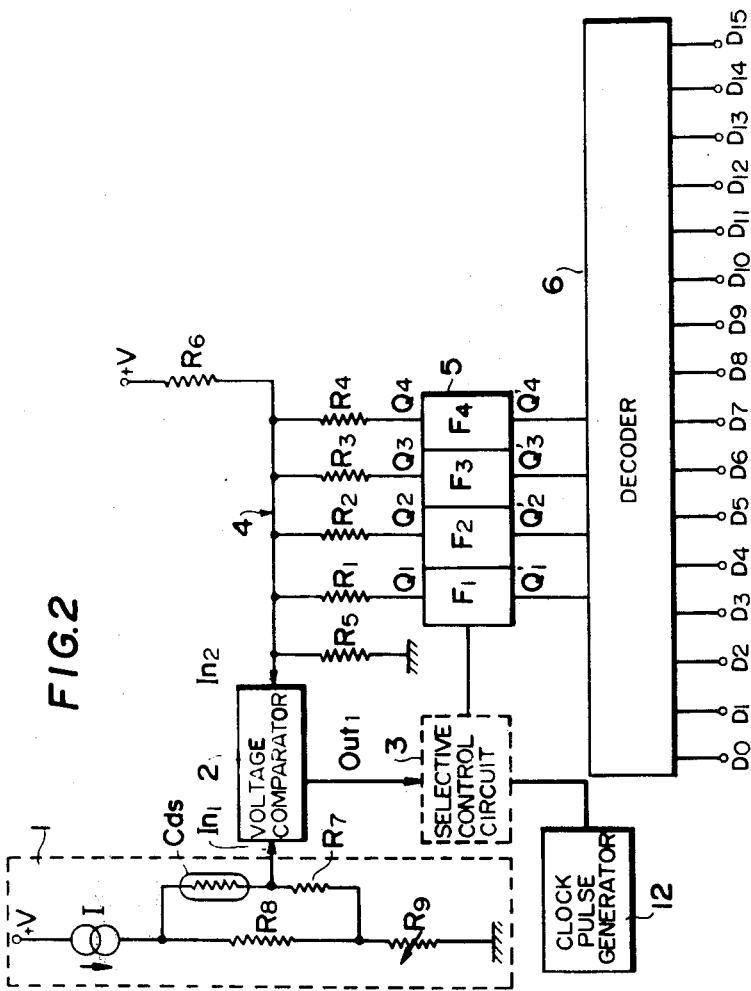
FIG. 2 is a circuit diagram showing an A-D conversion circuit for use with this invention.

The operation of the apparatus constructed as described above will hereinbelow be described in connection with the drawings. FIG. 2 shows the light measuring circuit 1 and the A-D converter circuit of FIG. 1. In the following description, circuits performing the same operations as those in FIG. 1 will be identified by the same reference numerals.

In FIG. 2, the broken-line block 1 represents the light measuring circuit, which is comprised of a constant-current power source I, a photoconductive cell "Cds", resistors $R_7$ and $R_8$, and a variable resistor $R_9$.

The photoconductive cell "Cds" receives the light from an object to be photographed passing through a camera lens, and a voltage is produced across the resistor $R_7$ in proportion to the logarithm of the light incident on the photoconductive cell Cds, that is, the object or scene brightness. Since a constant current flows in the variable resistor $R_9$ irrespective of its resistance value, a voltage appears across the resistor $R_9$ in proportion to its resistance value.

The light measuring circuit 1 is designed such that, in response to a change of one step in each of the film sensitivity and a preset aperture value, a voltage change equal to the voltage change across the resistor $R_7$ caused by a change of 1EV in the scene brightness may be obtained. With such an arrangement, a voltage indicative of the sum of the voltage proportional to the logarithm of the scene brightness and a voltage representing a preselected film sensitivity and the preset aperture value is provided as the output of circuit 1.

The voltage comparator circuit 2 includes a differential amplifier circuit and produces at an output terminal Out1 a pulse signal when the voltage level of input $In_2$ is lower than that of input $In_1$.

The selective control circuit 3 is supplied with the pulse signal Out1 from the voltage comparator circuit 2 to inhibit the passage therethrough of the clock pulses from the clock pulse generator circuit 12 to the binary pulse counter circuit 5 for a predetermined period of time. The binary pulse counter circuit 5 is composed of flip-flops $F_1$ to $F_4$ and is connected and constructed in a known manner for additive counting of the pulses. Reference characters $Q_1$ to $Q_4$ and $Q_1'$ to $Q_4'$ indicate output terminals of the respective stages of the flip-flops $F_1$ to $F_4$. The output terminals of each of the pairs $Q_1$ and $Q_1'$, $Q_2$ and $Q_2'$, . . . are common to each other and provide the same output.

Each output $Q_i$ ($i = 1$ to 4) becomes 1 or 0 in accordance with the pulse counting state. The resistance network 4 composed of resistors $R_1$ to $R_5$ is a circuit for converting the digital output from the binary pulse counter circuit 5 into an analog voltage in accordance with the output state. The analog voltage thus obtained is applied to the input terminal $In_2$ of the voltage comparator circuit 2.

The decoder 6 decodes the sixteen different, possible binary value outputs appearing at the output terminals $Q_1'$ to $Q_4'$ of the binary pulse counter circuit 5 and produces a logic 1 output at the proper one of the decimal value outputs $D_0$ to $D_{15}$ of the decoder 6. This circuit is also known.

A description will be made with regard to the operation of the above construction for converting the analog voltage output of circuit 1 (including the information such as the scene brightness and so on).

Figure 4:
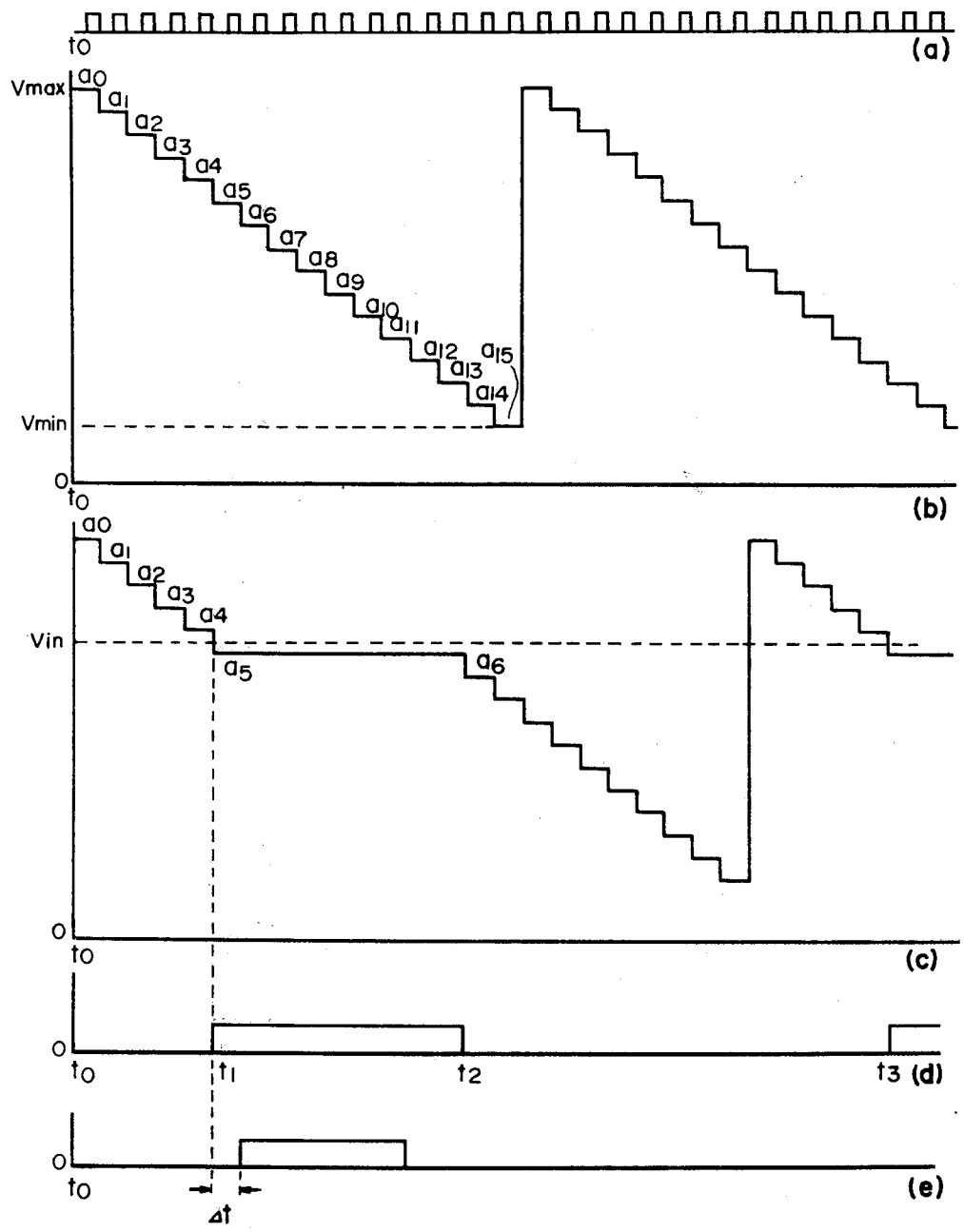
FIG. 4 shows a series of graphs, for explaining the operation of the A-D converter circuit used with this invention.

With continuous application of the clock pulses indicated by $a$ in FIG. 4 to the input terminal of the binary pulse counter circuit 5, a step wave form voltage indicated by $b$ in FIG. 4 is produced by the output of resistance network 4 and is supplied to the input terminal $In2$ of the voltage comparator circuit 2. The height of each step is selected to correspond to a 1EV increment of change in the voltage output from the light measuring circuit 1 which, as noted, is indicative of the sum of the voltage proportional to the logarithm of scene brightness, the film sensitivity, and the present aperture value.

Where the levels at the output terminals $Q_1$ to $Q_4$ of the binary pulse counter circuit 5 are all in the state of 1, the output from the resistance network 4 corresponds to a level $a_0$ as indicated by waveform $c$ in FIG. 4. At this time, the output from the decoder 6 is in the state of 1 only at the terminal $D_0$ and in the state of 0 at the other terminals. For the reasons described later on, the terminal $D_0$ need not always be provided. Then, upon impression of the clock pulses to the binary pulse counter circuit 5, the output from the resistance network 4 shifts to the level $a_1$ and, in the decoder 6, the output at the terminal $D_1$ is disposed at the 1 level.

Thereafter, the output level of the resistance network 4 lowers step by step in response to the sequential impression of the clock pulses and, at the same time, the position of the output at the level 1 in the decoder 6 shifts to the right, as shown in FIG. 2. When the outputs $Q_1$ to $Q_4$ from the binary pulse counter 5 are all at the level 0, the output level of the resistance network 4 is at $a_{15}$ and the output at the terminal $D_{15}$ of the decoder 16 is at the level 1. Upon impression of the next clock pulse under such condition, the circuit is returned to its initial condition. Thereafter, the same operation as described above is repeated.

Let it be assumed that the input $In1$ of the voltage comparator circuit 2 is supplied with a voltage of a level Vin as shown at $c$ in FIG. 4.

When the output from the resistance network 4 shifts from the level $a_4$ to $a_5$, a pulse signal is applied from the voltage comparator circuit 2 to the selective control circuit 3. By stopping the supply of the clock pulses to the binary pulse counter circuit 5 by this pulse signal for a predetermined period of time ($t_1$ to $t_2$), the binary pulse counter circuit 5 is held in its counting condition for this period of time and the output at the terminal $D_5$ is maintained at the level 1. This state is maintained unless the clock pulse is applied to the binary pulse counter circuit 5. As described above, where the output level of the light measuring circuit 1 lies between Vmax and Vmin, one of the terminals $D_1$ to $D_{15}$ will produce an output of 1. When the output level of the resistance network 4 is $a_0 (=$ Vmax$)$, the terminal $D_0$ is in the state of 1 but the level $a_0$ is not a level corresponding to the output from the light measuring circuit 1; rather it is a level corresponding to the starting position of the operation of the A-D converter circuit for the A-D conversion of the output from the light measuring circuit 1. Therefore, the terminal $D_0$ need not always be provided. The terminals $D_1$ to $D_{15}$ are adapted to correspond to different, respective exposure times, for example, the terminal $D_1$ corresponds in 1/2000 sec., the terminal $D_2$ corresponds to 1/1000 sec., . . . each separated by the unit value of 1EV.

Figure 3:
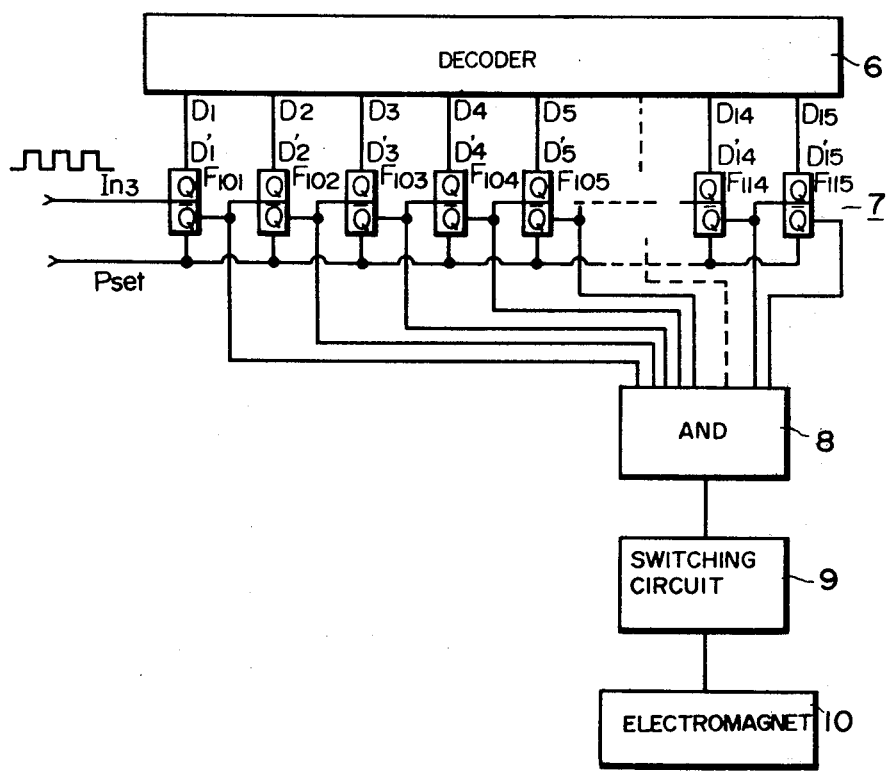
FIG. 3 is a circuit diagram showing a counter circuit for exposure time control as employed in the circuit of this invention.

FIG. 3 shows in detail the exposure time counting circuit 7 of FIG. 1, which comprises a presettable counter composed of flip-flops $F_{101}$ to $F_{115}$. In FIG. 3, the terminal $D_0$ of the decoder 6 is omitted. When supplied at the input $In3$ with the clock pulse, the counter circuit 7 effects binary subtractive counting. The flip-flops $F_{101}$ to $F_{115}$ have data input terminals $D'_1$ to $D'_{15}$ connected to the output terminals $D_1$ to $D_{15}$ of the decoder 6, respectively. Pset identifies a preset input terminal. Upon application of a pulse to the preset input terminal Pset, the states of the outputs $D_1$ to $D_{15}$ of the decoder 6 are entered in the flip-flops $F_{101}$ to $F_{115}$, respectively. For example, if the preset pulse is applied when the output terminal $D_5$ of the decoder 6 is in the state of 1, the output Q of the flip-flop $F_{105}$ becomes 1 and those outputs Q of the other flip-flops become 0. Upon application of a pulse to the input $In3$, subtraction is effected to provide a period of time corresponding to the output from the decoder 6. Presettable counters, per se, achieving such operation are well-known in the art, of course. The AND circuit 8 is provided for obtaining the logical product of the $\overline{Q}$ outputs of the flip-flops $F_{101}$ to $F_{115}$. When all the $\overline{Q}$ outputs are in the state of 1, the AND circuit 8 applies a signal 1 to the switching circuit 9. The switching circuit 9 is provided for controlling the operation of the electromagnet 10 and, upon arrival of the signal 1 from the AND circuit 8, serves to cut off the excitation of the electromagnet 10.

The exposure time counting operation in the above construction will be described.

Assume that when the output terminal $D_2$ of the decoder 6 is in the state of 1, this state is entered in the exposure time counting circuit 7 by the preset pulse applied to the preset input terminal Pset, putting the Q output of the flip-flop $F_{102}$ in its 1 state. Simultaneously with the opening of the shutter in ganged relation to the shutter actuating member (not shown), the clock pulse is applied to the input terminal $In3$ of the counter circuit 7 and when two clock pulses are applied, all the $\overline{Q}$ outputs of the counter circuit 7 become 1 to close the shutter. When the Q output of the third flip-flops $F_{103}$ is preset in the state of 1, the shutter is closed by four clock pulses. In a similar manner, where the output Q of the flip-flop $F_{104}$ is preset in the state of 1, the shutter is closed by the application of eight clock pulses to the counter circuit 7. Thus, where each flip-flop is preset in the state of 1, the shutter closing operation is achieved by the application of clock pulses twice as many as those in the case of the immediately preceding flip-flop being preset. In terms of time, each exposure time is twice as long as the immediately preceding one, and correspondingly the so-called anti-logarithmic conversion is effected.

As will be apparent from the foregoing, in the circuit of the above example, the exposure time to be controlled is not a continuously variable amount but varies in increments, or steps, of 1EV, with corresponding steps or incremental changes of exposure times, such as 1/2000 sec., 1/1000 sec., 1/500 sec., . . . . Accordingly, an error of the exposure time controlled in response to the light measured output from the light measuring circuit 1 can be suppressed within ±1/2EV.

The foregoing has described the operation of each component of the circuit of this invention and the following will describe the overall operation of the circuit in FIG. 1.

Light Measuring Operation

When the photographer views the object through the finder, he as well can view the exposure time, indicated in digital form by the display unit 11.

This indication is achieved in the following manner. In this case, assume that the output from the switching circuit 3-4 is at the level of 0 and the output Q from the flip-flop 3-6 is also at the level of 0. Under such conditions, the pulse signal from the voltage comparator circuit 2 is applied only through the one-shot multivibrator 3-1 and the NOR circuit 3-2 to the gate circuit 3-3 to control it. When the clock pulse train as depicted in FIG. 4 at ($a$) is applied to the binary counter circuit 5 through the gate circuit 3-3, and beginning at instant $t_0$, a voltage of corresponding, successively decreasing steps appears at the output of the resistance network 4 at, as indicated by $a_0$, $a_1$, . . . and $a_4$ in FIG. 4 at ($c$). If the output level of the light measuring circuit 1 is Vin, when the output from the resistance network 4 changes from $a_4$ to $a_5$, the pulse signal is applied from the voltage comparator circuit 2 to the one-shot multivibrator 3-1 to cause it to apply an output 1 to the NOR circuit 3-2 for a certain period of time ($t_1$ to $t_2$) as shown in FIG. 4 at ($d$). The NOR circuit 3-2 applies an output 0 to the gate circuit 3-3 to cause it to inhibit the passage therethrough of the clock pulses for the aforementioned certain period of time. Consequently, the binary counter circuit 5 interrupts its clock pulse counting and maintains the existing count, as shown at $a_5$ in waveform ($c$) of FIG. 4.

The output from the decoder 6 under this holding condition is employed as a signal for indication. When the output from the one-shot multivibrator 3-1 has returned to the state of 0, the gate circuit 3-3 permits the passage therethrough of the clock pulses and the binary counter circuit 5 counts the clock pulses until an instant $t_3$. The time between $t_1$ and $t_3$ is one cycle of the light measuring operation.

Thereafter, the same processes as described above are repeated. If the frequency of the clock pulse is selected to be on the order of some dozens of kilohertzs, the light measuring operation can be regarded as continuously effected in practice.

Photographing Operation

At the initial step in the shutter releasing operation, the output of the level 1 is applied from the switching circuit 3-4 to the AND circuit 3-5 and the flip-flop 3-6. Under such conditions, when supplied with the pulse signal from the voltage comparator circuit 2, the AND circuit 3-5 derives therefrom the output of the level 1 to set the output Q from the flip-flop 3-6 to a 1 state. Since the switching circuit 3-4 produces the output of the level 1 until the shutter is closed, the output Q from the flip-flop 3-6 similarly remains at its 1 level until the shutter is closed. Consequently, until exposure is completed, the gate circuit 3-3 inhibits the passage therethrough of the clock pulse and the scene brightness information is stored and the indicator unit maintains the indication of exposure time during exposure, too.

As described above, the 1 output is derived from the one-shot multivibrator 3-1 by the pulse signal from the voltage comparator circuit 2 and the scene brightness information is maintained by the binary counter circuit 5. At the same time, the output from the one-shot multivibrator 3-1 is applied to the delay circuit 15 and the delay circuit 15 produces the preset pulse as depicted in FIG. 4 at ($e$) which is delayed by $\Delta t$ behind the output from the one-shot multivibrator 3-1. The preset pulse thus obtained is applied to the exposure time counting circuit 7 and, by the preset pulse, the output from the decoder 6 is written into, i.e., stoned, in the exposure time counting circuit 7. The reason why the preset pulse is delayed by $\Delta t$ is to avoid erroneous operation in writing.

Simultaneously with the shutter opening ganged with the shutter releasing operation, the gate of the gate circuit 13 is opened and the clock pulses are applied from the clock pulse generator circuit 12 to the exposure time counting circuit 7 through the gate circuit 13 and the divider 14. The exposure time counting circuit 7 counts a number of clock pulses corresponding to the count value written into the circuit 7 during presetting. When the predetermined number of clock pulses has thus been counted, the excitation of the electromagnet 10 is cut off to close the shutter to complete the exposure and the output from the switching circuit 3-4 is returned to its 1 state. The divider 14 is useful for providing enhanced accuracy of the exposure time counting, too.

Figure 5:
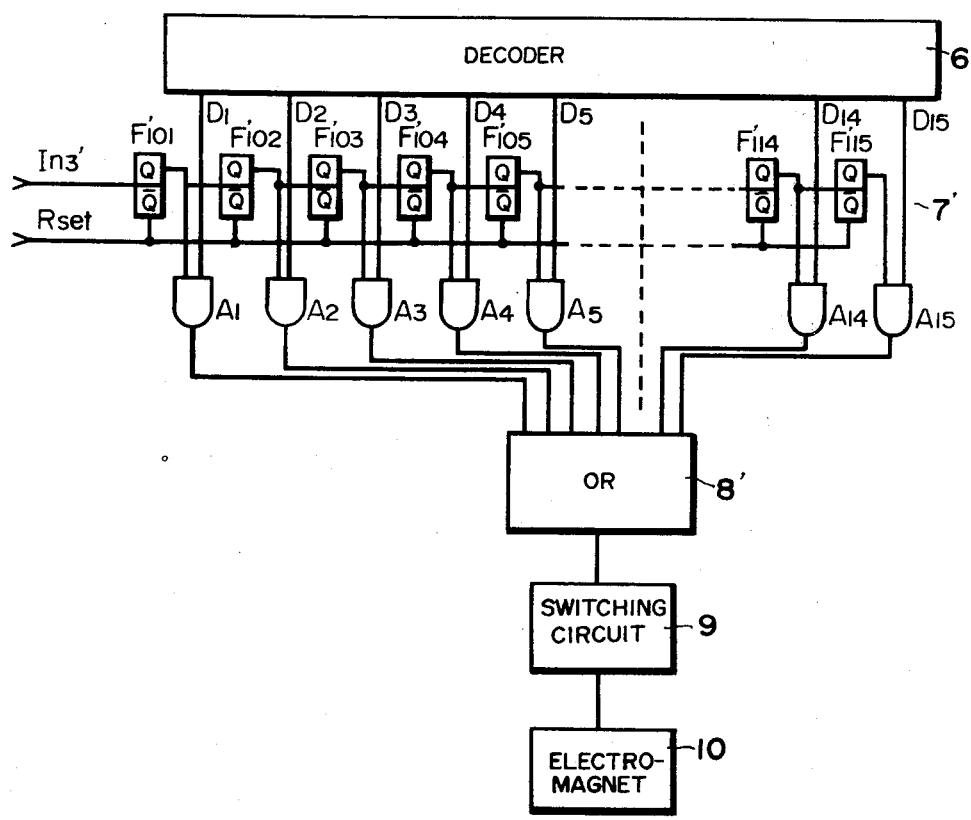
FIG. 5 is a circuit diagram illustrating another example of an exposure time control counter circuit for use in this invention.

FIG. 5 illustrates another example of the exposure time counting circuit, which can be substituted for the above-described presettable counter 7.

In FIG. 5, the decoder 6 is identical with the aforementioned one. Reference characters $F_{101}'$ to $F_{115}'$ designate flip-flops, which constitute an additive type binary counter circuit $7'$. Reference character $In3'$ indicates an input terminal which is supplied with the clock pulses, and Rset denotes a reset terminal, which is supplied with a reset pulse to reset the outputs Q of the flip-flops $F_{101}'$ to $F_{115}'$ at the level of 0. Reference character $A_1$ to $A_{15}$ identify AND circuits, which are respectively connected to the output terminals of the decoder 6 and to the Q outputs of the flip-flops $F_{101}'$ to $F_{115}'$ as illustrated. Reference numeral $8'$ represents an OR circuit, which is supplied with the outputs from the AND circuits $A_1$ to $A_{15}$. The operations of the switching circuit 9 and the electromagnet 10 are such as described in the foregoing.

FIG. 5 Operation

Let it be assumed that the terminal $D_3$ of the decoder 6 is in its 1 state. A reset pulse is produced by the delay circuit (15 in FIG. 1) and applied to the reset terminal Rset in place of the aforesaid preset pulse, thereby to reset all the outputs Q at the 0 level. Supplied with the clock pulses from the input terminal $In3'$ in ganged relation to the shutter releasing operation, the binary counter circuit $7'$ effects additive counting of the clock pulses.

In this case, when supplied with eight pulses, the output Q of the flip-flop $F_{103}'$ becomes 1 and the output 1 is fed from the AND circuit $A_3$ to the OR circuit $8'$. At this time, the switching circuit 9 and the electromagnet 10 perform the aforementioned operations to close the shutter. If the output terminal $D_4$ of the decoder 6 is in the state of 1, the shutter is closed by the counting of sixteen pulses and, if the output terminal $D_5$ is in the state of 1, the shutter closing operation is achieved by the counting of thirty-two pulses. Such an operation is the same as that in the case of the presettable counter described previously.

In the foregoing examples, the binary counter circuit 5 of the A-D conversion circuit is formed with four stages of flip-flops and the exposure time control range is set to have 15 stages, which number of stages is sufficient because the exposure time control range of usual cameras has been 12 stages.

As mentioned previously, the conversion from an analog value into a digital value inevitably produces a conversion error. This error can be reduced by selecting a small unit of counting.

A description will be given of examples for reducing the A-D conversion error.

Figure 6:
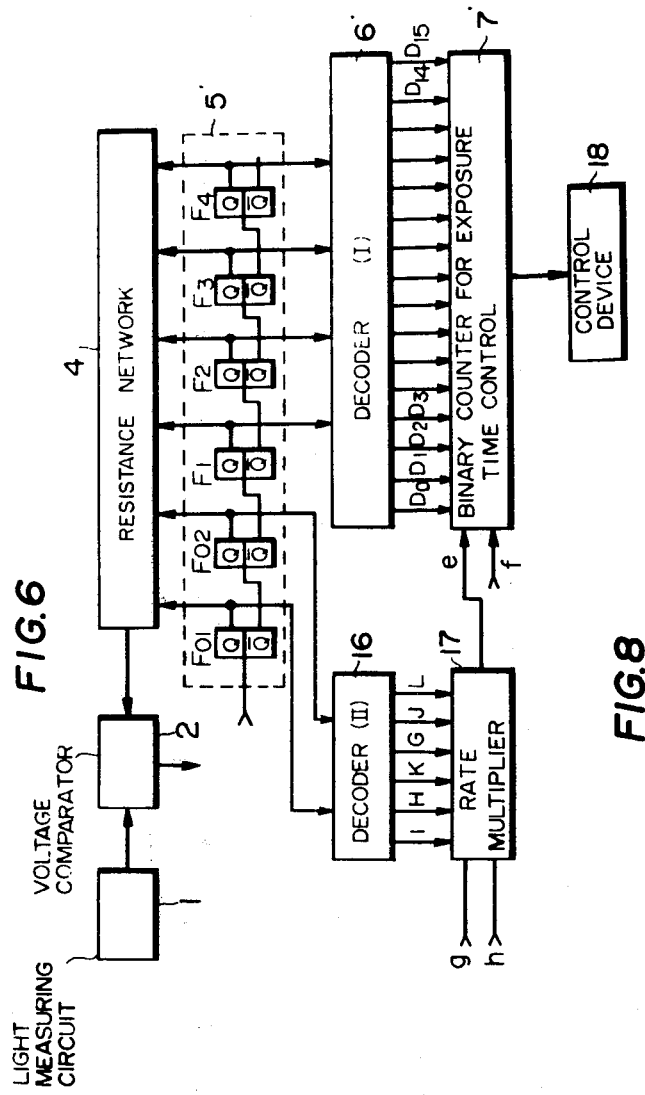
FIG. 6 is a circuit diagram illustrating another example of this invention.

In FIG. 6, parts corresponding to those described previously with regard to FIGS. 1 to 5 are identified by the same reference numerals and characters and no detailed description will be repeated; newly shown elements will be chiefly described. A control device 18 in FIG. 6 includes the AND circuit 8, the switching circuit 9 and the electromagnet 10 shown in FIG. 3.

In FIG. 6, flip-flops $F_{01}$ and $F_{02}$ are added to the binary counter circuit 5', by which the binary counter circuit 5' is formed to serve as a 6-bit logic circuit. It will be apparent that the resistance network 4' is modified accordingly. Further, there are newly provided a decoder 16 for converting digital outputs for the flip-flops $F_{01}$ and $F_{02}$ into other digital values, and a rate multiplier 17 which is supplied at its rate inputs with outputs from output terminals G, H, I, J, K, L of the decoder 16. Where the rate multiplier 17 is of 6-bit construction, it produces a desired number of pulses less than 63 in response to the counting of 64 clock pulses in accordance with the values of the rate inputs. The rate multiplier is of a well known type, as typically employed in an arithmetic operation circuit of electronic computers.

The output terminal of the rate multiplier 17 is connected to an input terminal $e$ of an exposure time controlling binary counter circuit 7'.

In the rate multiplier 17, its terminals $g$ and $h$ are clock pulse and enable input terminals respectively. When supplied at the terminal $h$ with the input 1, the rate multiplier 17 is actuated.

Turning now to FIG. 7, the operation of the circuit of FIG. 6 will be described.

In FIG. 6, the A-D conversion operation is identical with those in the cases of FIGS. 1 to 5 except that the digital output used is not 4-bit but 6-bit. In the case of the 4-bit digital output, 16 counting states are obtained and 15 memory steps each corresponding to 1EV can be established. In the case of the 6-bit digital output, 64 counting states are produced, so that 63 memory steps can be obtained. Accordingly, exposure information covering a range of 15EV at the unit of ¼EV can be stored in a digital manner.

The division of the output from the light measuring circuit 1 at the unit of ¼EV implies that an error can be suppressed within a range of +1/8EV.

FIG. 9 is a table showing the states of counting of the clock pulses by the binary counter circuit 5'. The table shows the states of the outputs Q of the flip-flops $F_{01}$ to $F_4$ when the clock pulses are applied to the counter circuit 5' in the order of 0, 1, 2, ... and the corresponding output levels of the resistance network 4' shown in FIG. 7(a). This table starts with the instant when the aforesaid outputs Q are all in the state of 1. As will be seen from the table, the flip-flops $F_{01}$ and $F_{02}$ return to the same states at every fourth impression of the clock pulse. Further, the states of the flip-flops $F_1$ to $F_4$ change as a whole at every fourth impression of the clock pulse to the counter circuit 5'. Such counting characteristics are utilized in the following manner.

The four stages of flip-flops $F_1$ to $F_4$ are used for processing the exposure information at the unit of 1EV as is the case with the counter 5 of the circuits of FIGS. 1 to 5. On the other hand, the two stages of flip-flops $F_{01}$ and $F_{02}$ are used for processing information of smaller than 1EV increments and which therefore cannot be processed by the four stages of flip-flops $F_1$ to $F_4$.

As illustrated in FIG. 7a, at every counting of the clock pulse by the counter 5', the output voltage from the resistance network 4' varies corresponding to ¼EV. Considering the state of the level $L_0$, the overall state of the flip-flops $F_1$ to $F_4$ does not change until the fourth clock pulse is applied to the counter 5'.

The process of the A-D conversion has been described previously with regard to FIGS. 1 to 5, and hence will not be described in detail.

The exposure time controlling binary counter circuit which employs the A-D converter circuit having the 6-bit digital output as described above, performs the following operation.

Figure 8:
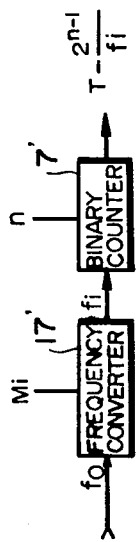
FIG. 8 is a block diagram, for explaining the operational principles of a rate multiplier and the exposure time control counter circuit in accordance with this invention.

In FIG. 8, reference numeral 7' designates the exposure time controlling binary counter circuit depicted in FIG. 6. Where an nth flip-flop of the binary counter circuit 7' is preset at the level of 1 and a clock pulse having a frequency of $f_i$ is applied, the exposure time T in this case is given by the following equation:

$$T = \frac{2^{n-1}}{f_i} \qquad (1)$$

For example, if $n=2$ and if $f_i=2000$Hz, the exposure time T is 1/1000 sec. and if $n=3$, the exposure time T is 1/500 sec. A change of one step doubles the counting time, and corresponds to a change of 1EV.

By the way, it is also possible to change the exposure time T by changing the frequency $f_i$ of the clock pulse, with $n$ being held constant.

In FIG. 8, the block 17' represents a frequency converter. In accordance with information Mi applied, the frequency converter 17' converts the clock pulse train of a frequency $f_0$ into trains of the frequencies given by the following equations:

$$f_1 = K \times f_0 \qquad (2)$$

$$f_2 = K/2^{¼} \times f_0 \qquad (3)$$

$$f_3 = K/2^{½} \times f_0 \qquad (4)$$

$$f_4 = \frac{K}{2^{3/4}} \times f_0 \qquad (5)$$

where K is a constant. Assume that $n$ is constant and that the clock pulses of the frequencies $f_1$ to $f_4$ are applied to the binary counter circuit 7'. In the case of the frequency $f_1$, an exposure time $T_1$ is obtained from the equation (1) as follows:

$$T_1 = K' \cdot 2^{n-1}/f_0 \qquad (6)$$

In the cases of the frequencies $f_2$, $f_3$ and $f_4$, exposure times are similarly obtained as follows:

$$T_2 = K' \cdot \frac{2^{n-1}}{f_0} \times 2^{1/2} \qquad (7)$$

$$T_3 = K' \cdot \frac{2^{n-1}}{f_0} \times 2^{2/4} \qquad (8)$$

$$T_4 = K' \cdot \frac{2^{n-1}}{f_0} \times 2^{3/4} \qquad (9)$$

where $K' = 1/K$.

As will be understood from the above equations, the exposure time increases $4\sqrt{2}$ times. This corresponds to a change for each step of ¼EV. This invention embodies this principle with a single circuit construction.

In FIG. 6, the rate multiplier 17 corresponds to the frequency converter 17' as described above and converts the frequency as given by the following equation:

$$f_{out} = \frac{M \cdot f_{in}}{64} \qquad (10)$$

where $$M = G.2^5 + H.2^4 + I.2^3 + J.2^2 + K.2^1 + L.2^0 \qquad (11)$$

$f_{in}$ is the frequency of the clock pulse applied to the rate multiplier 17 and $f_{out}$ is the output frequency, as converted by the rate multiplier 17.

Figures 10, 11, 13:
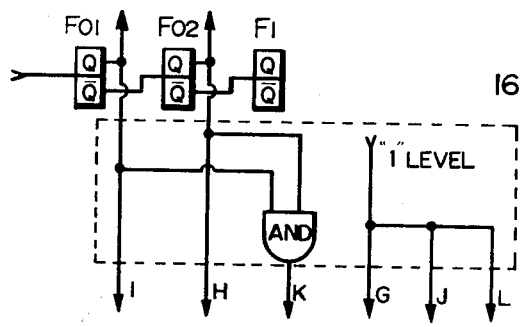
FIG. 10 is a table showing the outputs from flip-flops $F_{01}$ and $F_{02}$ and the codes into which the outputs are converted by a decoder 16 in the FIG. 6 example.
FIG. 11 is a detailed circuit diagram of the decoder 16 in FIG. 6.
FIG. 13 is a table showing the outputs from the flip-flops $F_{01}$ and $F_{02}$ and the codes into which the outputs are converted by the decoder $16'$ exemplified in FIG. 12.

Reference characters G to L indicate input terminals of the rate multiplier 17, each of which is supplied with a 1 or 0 signal. If only the terminal G is 1, M=32 and $f_{out}=32/64 \times f_{in}=\frac{1}{2}f_{in}$. In practice, the terminals G to L are supplied with signals as shown in the table of FIG. 10 by the decoder 16 constructed as depicted in detail in FIG. 11.

In this case, four M's are selected in accordance with the four states of the outputs Q of the flip-flops $F_{01}$ and $F_{02}$. This relationship is also shown in FIG. 10.

Applying the clock pulse of a frequency $F_0$ to the rate multiplier 17, clock pulses of the following frequencies are obtained in accordance with the value of M:

$$F_1 = \frac{63}{64} F_0 \text{ (in the case of } M=63) \qquad (12)$$

$$F_2 = \frac{53}{64} F_0 \text{ (in the case of } M=53) \qquad (13)$$

$$F_3 = \frac{45}{64} F_0 \text{ (in the case of } M=45) \qquad (14)$$

$$F_4 = \frac{63}{64} F_0 \text{ (in the case of } M=63) \qquad (15)$$

The relationship between the frequencies $F_1$ and $F_2$ is as follows:

$$F_2/F_1 = 53/63 \approx 0.841 \qquad (16)$$

In a similar manner, it follows that $$F_3/F_2 = 45/53 \approx 0.849 \qquad (17)$$

and that $$F_3/F_4 = 37/45 \approx 0.822 \qquad (18)$$

While, since $$1/4\sqrt{2} \approx 0.841 \qquad (19)$$

the flip-flops $F_1$, $F_2$, $F_3$ and $F_4$ can be adapted to correspond to the frequencies $f_1$, $f_2$, $f_3$ and $f_4$ given by the equations (2) to (5), respectively. Accordingly, the exposure time can be controlled at the unit of ¼/EV. An error between the value 0.822 given by the equation (18) and that 0.841 by the equation (19) is about 2% and it is 2% at a maximum, so that the error is negligible.

Now, the operation will be discussed more concretely.

Let it be assumed that the level $L_6$ shown in FIGS. 7a and 9 is stored. In this case, as shown in FIG. 6, the terminal $D_1$ of the decoder 6' becomes 1 and the output 1 is written in the second stage flip-flop of the exposure time controlling binary counter circuit 7'.

On the other hand, the outputs of the flip-flops $F_{01}$ and $F_{02}$ of the binary counter 5' are 1 and 0 respectively, so that M is selected to have a value of 45 as shown in the table of FIG. 10. The value 45 is provided by setting such codes as given in the table of FIG. 10 in the rate multiplier 17 by means of the decoder 16 depicted in FIG. 11.

The decoder 16 includes one AND circuit and is very simple in construction.

Where the enable terminal $h$ is set to the state of 1 simultaneously with the shutter releasing operation and the clock pulse having a frequency of 4063Hz is applied to the terminal $g$ of the rate multiplier 17, the exposure time in this case is obtained from the equation (14) as follows:

$$T = \frac{2^{2-1}}{\frac{45}{64} \times 4063} \approx \frac{1}{1428} (\text{sec.}) \qquad (20)$$

Similarly, in the case of the level $L_7$:

$$T = \frac{2^{2-1}}{\frac{37}{64} \times 4063} = \frac{1}{1174} (\text{sec.}) \qquad (21)$$

and in the case of the level $L_8$:

$$T = \frac{2^{3-1}}{\frac{63}{64} \times 4063} = \frac{1}{1000} (\text{sec.}) \qquad (22)$$

The difference between successive ones of the equations (20), (21) and (22) corresponds to the step of substantially ¼EV.

Thereafter, the step of ¼EV is similarly obtained.

As described above, with the FIG. 6 example, the exposure time can be automatically controlled more accurately by the digital circuit. Strictly speaking, the rate multiplier 17 operates such that when 64 pulses are applied thereto, it selectively removes some of them and provides as an output a predetermined, corresponding number of pulses. This is not frequency conversion. However, by increasing the frequency of the clock pulse applied to the rate multiplier 17 and connecting a frequency divider circuit between the output of the rate multiplier 17 and the exposure time controlling binary counter circuit 7', the above operation can be regarded as frequency conversion. Further, with the use of the frequency divider circuit, it is possible to absorb an error in the counting of the clock pulse which is caused by an error in the timing for switching the gate circuit ganged with the shutter releasing operation.

In the present example, the binary counter 5' is described to be of the 6-bit construction but the number of bits used can be easily adjusted and this invention is not limited specifically to the present example.

Further, it is evident that the output from the decoder 6' can be used as a signal for the digital indication of the exposure time.

Figure 12:
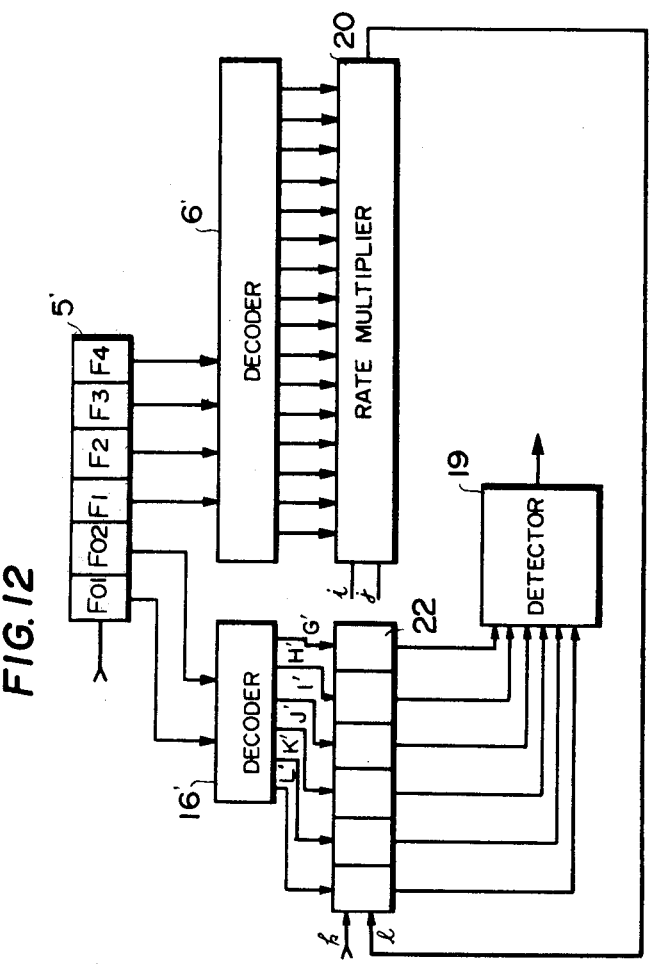
FIG. 12 is a circuit diagram illustrating another example of the decoder.

FIG. 12 illustrates another example of this invention. In FIG. 12, reference numerals 5' and 6' identify corresponding elements of those in FIG. 6 respectively. In accordance with the states of the flip-flops $F_{01}$ and $F_{02}$ of the binary counter circuit 5', the decoder 16' supplies a binary counter 22 with outputs as one depicted in FIG. 13.

The binary counter circuit 22 is a 6-bit presettable down counter, in which the output from the decoder 16' is written when a preset pulse is applied to a terminal $k$. For example, where the flip-flops $F_{01}$ and $F_{02}$ are both in the state of 1, a code corresponding to a value 37 in the column of the multiple M in the table of FIG. 13 is written in the binary counter circuit 22. At this time, the clock pulse is applied to terminal $e$ and when the binary counter circuit 22 has received and counted 37 clock pulses, its count content, or count accumulation becomes 0; this is detected by a detector circuit 19, thus closing the shutter.

Where a code corresponding to value 63 is written as the multiple M' in the binary counter circuit 22, the counting of 63 pulses is achieved. As will be understood from the foregoing, the common ratio of the series of the values 37, 45, 53 and 63 of the multiple M' is substantially $4\sqrt{2}$, and the ratio of the pulse counting time is also $4\sqrt{2}$ and corresponds to ¼EV of the exposure time.

Thus, the rate multiplier 20 performs the function of a frequency divider; when supplied at its terminal $j$ with clock pulses of the frequency $F_0$, the rate multiplier 20 produces output clock pulses having a frequency $F_n=F_0/2^n$ in accordance with its preset state as established by the decoder 6', where $n$ is any one of 1, 2, . . . and 16. For example, in the case of the level $L_i$ being $L_{10}$ in FIG. 9, $n$ is selected to be 3.

The output from the decoder 6' has the exposure information of 1EV step, by which the frequency of the clock pulse is varied step by step corresponding to 1EV by the use of the rate multiplier 20. Namely, the frequency is varied by 1EV, and the number of pulses to be counted by the binary counter 22 is determined and a control of ¼EV is achieved in accordance with the pulse counting time.

The terminal $i$ of the rate multiplier 20 is an enable terminal.

In this invention, processing of the brightness level information in units of less than 1EV is allotted to one part of the binary counter 22 in the A-D converter circuit and processing of the information in units of 1EV is allotted to the other part of the binary counter 22, whereby a control of the exposure time by a digital circuit of high accuracy is effected.

In the case of using 6 bits, if the frequency of the clock pulse is selected to be 10KHz (the frequency can also be raised higher, of course), one scanning time $t$ for the A-D conversion becomes such that $t=64/10K=6.4$ (milliseconds) and it is very short. Namely, a period of time shorter than several milliseconds is sufficient for storing the scene brightness information. By the combined use of a circuit having characteristics of the above storing operation and such a digital expanding circuit as described above, it is possible to provide a circuit suitable for fabrication as a very practical integrated circuit.

It will be apparent that many modifications and variations may be effected without departing from the scope of the concepts of this invention.

What is claimed is:

1. An automatic exposure time control circuit for a camera having a lens and a shutter and wherein scene brightness is measured in accordance with the light level received from the scene and passing through the camera lens, comprising:
    a. a light measuring circuit for measuring the scene brightness in accordance with the light level thereof passing through the camera lens, and producing an electric output signal proportional to the logarithm of the scene brightness;
    b. an A-D converter circuit for receiving and converting the electric output signal from said light measuring circuit to a digital output signal;
    c. a first decoder for decoding the digital output signal from said A-D converter circuit, said first decoder having a plurality of output terminals and selectively producing an output signal at a corresponding one of said output terminals thereof in accordance with the digital output signal from said A-D converter circuit, whereby said corresponding output terminal at which the output signal is produced is indicative of the digital output of the A-D converter circuit;
    d. a pulse generator for producing clock pulses of a given repetition rate; and
    e. an exposure time control circuit including a binary counter having the same number of stages as the number of output terminals of said first decoder, each of said stages comprising a flip-flop circuit coupled with a corresponding one of said output terminals of said first decoder; means responsive to initiation of exposure for initiating counting of the clock pulses by said binary counter; and means for terminating the exposure when said binary counter has counted a number of clock pulses corresponding to the count represented by the flip-flop circuit stage coupled with said corresponding output terminal of said decoder at which the output signal of said decoder selectively is produced.

2. An automatic camera exposure time control circuit according to claim 1, wherein said binary counter is a presettable binary counter and subtractively counts said clock pulses, each of said flip-flop circuits of said presettable binary counter having a data input terminal connected to a respectively corresponding one of said output terminals of the first decoder and having an output terminal; and said terminating means comprises an AND circuit having a plurality of inputs connected to the output terminals of respectively corresponding ones of said flip-flop circuits and responsive to the outputs at said output terminals of said flip-flop circuits all being the same, to produce an output for terminating the exposure.

3. An automatic camera exposure time control circuit according to claim 1, wherein said binary counter additively counts said clock pulses; and there is further provided a plurality of AND circuits equal in number to the number of said flip-flop circuits, and each having first and second input terminals and an output terminal, a first input terminal of each AND circuit being connected to a corresponding one of said output terminals of said first decoder; each of said flip-flop circuits includes an output terminal connected to the second input terminal of a corresponding one of said AND circuits; and said terminating means includes an OR circuit having plural input terminals connected to the output terminals of respectively corresponding ones of said AND circuits and responsive to an output from any of said AND circuits for producing an output for terminating the exposure.

4. An automatic exposure time control circuit for a camera having a lens and a shutter and wherein scene brightness is measured in units of 1 Ev, in accordance with the light level received from the scene and passing through the camera lens, comprising:
   a. a light measuring circuit for measuring the scene brightness in accordance with the like level thereof passing through the camera lens, and producing an electric output signal proportional to the logarithm of the scene brightness;
   b. an A-D converter circuit for receiving and converting the electric output signal from said light measuring circuit to a digital output signal, said A-D converter comprising a binary counter having a first counter portion for accumulating counts each corresponding to a unit of 1Ev and a second counter portion for accumulating counts each corresponding to a fraction of a unit of 1Ev of the scene brightness information;
   c. a first decoder for decoding the digital output signal from said first counter portion of said binary counter of said A-D converter circuit, said first decoder having a plurality of output terminals and selectively producing an output signal at a corresponding one of said output terminals thereof in accordance with the digital output signal from said first counter portion of said A-D converter circuit, whereby said corresponding output terminal at which the output signal is produced is indicative of the digital output of said first counter portion of the A-D converter circuit;
   d. a pulse generator for producing clock pulses of a given repetition rate;
   e. a frequency converter for converting the frequency of the clock pulses from said clock pulse generator in accordance with the count accumulated by said second counter portion and producing frequency converted output clock pulses;
   f. an exposure time control circuit including a binary counter having the same number of stages as the number of output terminals of said first decoder, each of said stages comprising a flip-flop circuit coupled with a corresponding one of said output terminals of said first decoder; means responsive to initiation of exposure for initiating counting of the frequency converted clock pulses by said binary counter; and means for terminating the exposure when said binary counter has counted a number of the frequency converted clock pulses corresponding to the count represented by the flip-flop circuit stage coupled with said corresponding output terminal of said first decoder at which the output signal of said first decoder selectively is produced.

5. An automatic camera exposure time control circuit according to claim 4 wherein said frequency converter comprises a rate multiplier and wherein there is further provided a second decoder for decoding the count output of said second counter portion of said binary counter of said A-D converter and producing corresponding coded outputs and said rate multiplier includes rate input control terminals for receiving the coded outputs of said second decoder for establishing a multiplication rate of said rate multiplier.

6. An automatic camera exposure time control unit for a camera having a shutter wherein scene brightness is measured in units of 1Ev, comprising:
   a. a light measuring circuit for measuring the scene brightness and producing an electric output signal proportional to the logarithm of the scene brightness;
   b. a pulse generator for producing clock pulses of a given repetition rate;
   c. an A-D converter circuit including a binary counter for receiving and counting the clock pulses from said pulse generator and having a first portion for accumulating counts each corresponding to a fraction of a unit of 1Ev and a second portion for accumulating counts each corresponding to a unit of 1Ev of the scene brightness, said A-D converter circuit producing a digital count output from said first and second counter portions thereof corresponding to the electric output signal of said light measuring circuit;
   d. a first decoder for decoding the digital count output of said first binary counter portion and producing a first decoded output representative thereof and a second decoder for decoding the digital count output of said second binary counter portion and producing a second decoded output representative thereof;
   e. a rate multiplier having multiplication rate control inputs and a clock pulse input and receiving the outputs of said first decoder at said rate control inputs and the clock pulses from said pulse generator at said clock pulse input and producing a clock pulse output at a rate differing from the input in accordance with the multiplication rate inputs from said first decoder;
   f. an exposure time control counter circuit comprising a presettable binary counter having count setting inputs connected to the outputs of said second decoder and having a counting input connected to said rate multiplier for receiving the converted clock pulse output thereof; and
   g. means responsive to initiation of exposure for initiating counting of the clock pulse output of said rate multiplier by said presettable binary counter and means for terminating the exposure when said presettable binary counter has counted a number of clock pulses from said rate multiplier corresponding to the count preset therein by the output of said second decoder.

7. An automatic exposure time control circuit for a camera, comprising:
   a. a light measuring circuit for measuring scene brightness and producing an analog electric signal proportional to the logarithm of the scene brightness;
   b. an A-D converter circuit for converting said analog signal to a digital output;
   c. means for providing clock pulses of a variable repetition rate;
   d. a first binary counter for counting said clock pulses;

e. a first decoder responsive to the digital output of said A-D converter for producing a first decoded output;

f. means for controlling the clock pulse providing means to vary the repetition rate of the clock pulses with relation to the power series of 2 in accordance with the first decoded output of said first decoder;

g. means for initiating counting of pulses by said first binary counter when exposure is initiated; and h. means for terminating exposure when said first binary counter counts a given number of pulses.

8. An automatic exposure time control circuit according to claim 7, wherein said A-D converter circuit includes a second binary counter for storing said digital output converted from said analog signal output of said light measuring circuit, said second binary counter comprising a plurality of stages of flip-flop circuits including initial stages and subsequent stages, and there is further provided a second decoder connected and responsive to the outputs of said initial stages of said flip-flop circuits of said second binary counter for determining said given number of pulses to be counted by said first binary counter, and said first decoder being connected and responsive to the outputs of said subsequent flip-flop circuit stages of said second binary counter.

9. The automatic exposure time control circuit according to claim 7 wherein said clock pulse providing means comprises a frequency divider for converting a clock pulse of repetition frequency Fo into clock pulses of a repetition frequency $Fo/2^n$ where $n$ is a number corresponding to the decoded output of said first decoder.

10. The automatic exposure time control circuit according to claim 8 wherein scene brightness is measured in units of 1Ev as defined in the APEX system (ASA-PH212-1961) and wherein said initial flip-flop stages of said second binary counter store a digital output corresponding to scene brightness and measured as a fraction of a unit of 1Ev and wherein said subsequent flip-flop stages store a digital output corresponding to scene brightness measured in units of 1Ev.

11. An automatic exposure time control circuit for a camera comprising:

a. a light measuring circuit for measuring the scene brightness and producing an analog electric signal proportional to the logarithm of the scene brightness;

b. an A-D converter circuit including a plurality of stages of flip-flop circuits consisting of initial stages and subsequent stages, said initial stages having a plurality of first selectable digit values, said subsequent stages having a plurality of second selectable digit values and said A-D converter circuit converting said analog signal into a set of digit values including one of said first selectable digit values and one of said second selectable digit values;

c. means for providing clock pulses of a variable repetition rate;

d. means for controlling said clock pulse providing means to vary the repetition rate of the clock pulses in accordance with said one of the first selectable digit values;

e. a binary counter for counting said clock pulses, said binary counter having a plurality of stages of flip-flop circuits;

f. means for relating each of said second selectable digit values with a respectively corresponding number of stages of said flip-flop circuits of said binary counter in cascade connection;

g. means for initiating counting of the clock pulses by said binary counter when exposure is initiated; and h. means for terminating the exposure when said binary counter counts a number of clock pulses determined by the count capacity for said number of the stages of said flip-flop circuits which is related to said one of the second selectable digit values to which the analog signal for a given scene brightness is converted.

12. An automatic exposure time control circuit for a camera for automatically adjusting exposure time in accordance with scene brightness, comprising:

a. a light measuring circuit for measuring the scene brightness and producing an analog electric signal proportional to the logarithm of the scene brightness;

b. an A-D converter circuit having a plurality of selectable digit values for converting said analog signal into one of said digit values;

c. a pulse generator for producing clock pulses of a given repetition rate;

d. a binary counter for counting said clock pulses, said binary counter having a plurality of stages of flip-flop circuits;

e. means for relating each of said selectable digit values with a respectively corresponding number of stages of said flip-flop circuits in cascade connection, f. means for initiating counting of the clock pulses by said binary counter when exposure is initiated; and g. means for terminating the exposure when said binary counter counts a number of clock pulses determined by the count capacity for said number of the stages of said flip-flop circuits which is related to said one of the digit values to which the analog signal for a given scene brightness is converted.

* * * * *

UNITED STATES PATENT AND TRADEMARK OFFICE
CERTIFICATE OF CORRECTION

PATENT NO. : 3,995,284
DATED : November 30, 1976
INVENTOR(S) : Mashio Kitaura et al It is certified that error appears in the above-identified patent and that said Letters Patent are hereby corrected as shown below:

Column 7, line 27, delete "at".
Column 8, line 14, change "stoned" to --stored--.
Column 9, line 63, "+1/8EV" should be --±1/8EV--.
Column 13, line 15, "one" should be --are--.

Signed and Sealed this

Fifth Day of April 1977

[SEAL]

Attest:

RUTH C. MASON
Attesting Officer

C. MARSHALL DANN
Commissioner of Patents and Trademarks